(12) United States Patent
Hahn

(10) Patent No.: US 12,202,445 B2
(45) Date of Patent: Jan. 21, 2025

(54) OPTICAL OR OPTOELECTRONIC DEVICE HAVING A CLEANING DEVICE

(71) Applicant: Continental Automotive GmbH, Hannover (DE)

(72) Inventor: Torsten Hahn, Frankfurt am Main (DE)

(73) Assignee: Continental Automotive GmbH, Hannover (DE)

( * ) Notice: Subject to any disclaimer, the term of this patent is extended or adjusted under 35 U.S.C. 154(b) by 1083 days.

(21) Appl. No.: 16/972,089

(22) PCT Filed: Jun. 11, 2019

(86) PCT No.: PCT/EP2019/065202
§ 371 (c)(1),
(2) Date: Dec. 4, 2020

(87) PCT Pub. No.: WO2019/238671
PCT Pub. Date: Dec. 19, 2019

(65) Prior Publication Data
US 2021/0221333 A1    Jul. 22, 2021

(30) Foreign Application Priority Data

Jun. 11, 2018   (DE) ..................... 10 2018 209 286.9

(51) Int. Cl.
*B60S 1/52*     (2006.01)
*B08B 3/02*     (2006.01)
(Continued)

(52) U.S. Cl.
CPC .................. *B60S 1/52* (2013.01); *B08B 3/02* (2013.01); *B60S 1/56* (2013.01); *G01S 7/4813* (2013.01);
(Continued)

(58) Field of Classification Search
CPC .................................................. G02B 27/0006
See application file for complete search history.

(56) References Cited

U.S. PATENT DOCUMENTS 4,368,505 A * 1/1983 Tomforde ................. B60S 1/52
362/253
9,844,804 B2   12/2017 De et al.
(Continued)

FOREIGN PATENT DOCUMENTS

CN    104095587 A    10/2014
CN    107000705 A     8/2017
(Continued)

OTHER PUBLICATIONS

Chinese Office Action for Chinese Application No. 201980038423.3, dated Dec. 20, 2023 with translation, 11 pages.
(Continued)

*Primary Examiner* — Yuqing Xiao
*Assistant Examiner* — Zhengqing Qi
(74) *Attorney, Agent, or Firm* — Buchanan Ingersoll & Rooney PC

(57) ABSTRACT

An optical or optoelectronic device with at least one transparent cover and with a cleaning device for cleaning the surface of the cover with a fluid cleaning agent. In order to effectively clean such a device, in particular a LiDAR device, without the external appearance being disturbed by visible components of a cleaning device, it is proposed that the jet of cleaning agent is directed against a reflector, which is at least temporarily or permanently arranged and aligned at a distance from the outlet opening and the surface, so that the jet of cleaning agent is reflected by the reflector and is deflected onto the surface as at least one spray jet.

14 Claims, 3 Drawing Sheets

(51) Int. Cl.
  *B60S 1/56* (2006.01)
  *G01S 7/481* (2006.01)
  *G02B 27/00* (2006.01)
  *G01S 17/931* (2020.01)

(52) U.S. Cl.
  CPC ........ *G02B 27/0006* (2013.01); *G01S 17/931* (2020.01)

(56) References Cited

U.S. PATENT DOCUMENTS

| | | | |
|---|---|---|---|
| 10,293,794 | B2 | 5/2019 | McAndrew |
| 10,744,979 | B2 | 8/2020 | Schmidt et al. |
| 10,752,219 | B2 | 8/2020 | Ringler et al. |
| 11,103,115 | B2 | 8/2021 | Kim et al. |
| 2002/0053609 | A1 | 5/2002 | Han et al. |
| 2011/0069299 | A1* | 3/2011 | Hsu .................. G01C 3/085 356/4.02 |
| 2011/0292212 | A1 | 12/2011 | Tanabe et al. |
| 2015/0183406 | A1 | 7/2015 | Tanaka et al. |
| 2017/0036647 | A1* | 2/2017 | Zhao ............. G02B 27/0006 |
| 2017/0259789 | A1* | 9/2017 | McAndrew ........... B07B 1/155 |
| 2018/0361997 | A1* | 12/2018 | Schmidt .............. G02B 27/00 |

FOREIGN PATENT DOCUMENTS

| | | |
|---|---|---|
| CN | 107536579 A | 1/2018 |
| CN | 108025704 A | 5/2018 |
| DE | 2926305 A1 | 1/1981 |
| DE | 4244453 A1 | 6/1994 |
| DE | 19802628 A1 | 8/1999 |
| DE | 102010007850 A1 | 9/2010 |
| DE | 102014117165 A1 | 5/2016 |
| DE | 102015217546 B3 | 3/2017 |
| DE | 202016001218 U1 | 5/2017 |
| DE | 102015015910 B3 | 6/2017 |
| DE | 102018114152 A1 | 12/2018 |
| TW | 201351064 A | 12/2013 |
| WO | 2015161097 A1 | 10/2015 |

OTHER PUBLICATIONS

International Search Report and Written Opinion for International Application No. PCT/EP2019/065202, mailed Oct. 2, 2019, with partial English translation, 16 pages.

German Search Report for German Application No. 10 2018 209 286.9, dated Jun. 9, 2020, with partial English translation, 9 pages.

Office Action (The Second Office Action) issued Jun. 27, 2024, by the State Intellectual Property Office of People's Republic of China in corresponding Chinese Patent Application No. 201980038423.3 and an English translation of the Office Action. (15 pages).

* cited by examiner

OPTICAL OR OPTOELECTRONIC DEVICE HAVING A CLEANING DEVICE

CROSS REFERENCE TO RELATED APPLICATIONS

This application is the U.S. National Phase Application of PCT International Application No. PCT/EP2019/065202, filed Jun. 11, 2019, which claims priority to German Patent Application No. 10 2018 209 286.9, filed Jun. 11, 2018, the contents of such applications being incorporated by reference herein.

FIELD OF THE INVENTION

The invention relates to an optical or optoelectronic device with a cleaning device, which is preferably provided in an integrated manner, for cleaning a transparent cover of the device, in particular a light-transmissive cover of a laser-based measuring device for arrangement in the outside area of a vehicle.

BACKGROUND OF THE INVENTION

It is known to use in motor vehicles assistance systems with optical and/or optoelectronic sensors which support the vehicle user when driving the vehicle or allow driver-independent autonomous driving.

For example, it is known to use so-called "LiDAR" or "LaDAR" devices (Light/Laser Detection and Ranging) for optically scanning the surroundings of a vehicle. Such systems are attached to the vehicle in the outside area and have at least one transmitting unit, which emits a laser beam, and at least one receiving unit, which detects a laser beam reflected by an obstacle.

To provide protection from environmental effects and effects of the weather, covers designed to be transparent at least to the functionally required wavelengths of light are used. These covers must always be kept clean, because contamination can lead to malfunctions.

For optimum functionality, LiDARs usually have to be arranged on the vehicle at particularly exposed places, such as in the radiator grille, and are therefore expected to meet demanding requirements for their external appearance and design. There is therefore a desire to make a cleaning device as inconspicuous as possible. However, the known conventional cleaning devices in the manner of a windshield or headlight cleaning device and the known camera cleaning devices are either too complex, and require too much space to be accommodated satisfactorily at the intended installation location, or have protruding spray nozzles which contribute to an inharmonious appearance.

SUMMARY OF THE INVENTION

Against this background, an aspect of the invention is based on offering a solution for cleaning optical or optoelectronic devices of the generic type, which can be optimally used in particular with a LiDAR, meets increased design requirements for the external appearance and is as simple and inexpensive to manufacture as possible.

This object is by a device with features according to the main claim. Developments and further exemplary embodiments of the invention will emerge from the dependent claims and the following description and figures.

An aspect of the invention provides that the jet of cleaning agent is directed against a reflector, which is temporarily or permanently arranged and aligned at a distance from the outlet opening and from the surface, so that the jet of cleaning agent is reflected by the reflector and is deflected onto the surface as at least one spray jet.

The nozzle is thus arranged concealed under the reflector and, though it provides the cleaning function, the device thus has a particularly harmonious visual appearance without a cleaning device as such being explicitly recognizable.

The visible area of the reflector can in this case be formed in almost any mimicking or inconspicuous way or as a design element—for example as a spherical or flat button—and placed symmetrically in the center of the surface.

According to the preferred development, the device may in this case have at least a first and a second area to be cleaned, which are spatially separated from one another, and wherein each area is respectively assigned to a separate functional unit, each with at least one optical axis of its own. In this case, the cleaning device may preferably be designed for the simultaneous cleaning of the two areas and for this purpose form on the reflector at least two essentially flat spray jets, which are separated from one another in the circumferential direction with respect to the spray axis and are oriented in different radial directions such that each area is wetted by at least one spray jet.

This means that LiDARs, camera clusters and sensor clusters can be served effectively, efficiently and cost-effectively by a hidden cleaning device.

An aspect of the invention further provides that the spray jets are separated and shaped by webs which extend from the reflector essentially in the direction of the surface and are radially at a distance from the spray axis, so that between two adjacent webs in the circumferential direction there is a breakthrough for the exiting of one spray jet in each case.

The design and arrangement of the webs allow the number, shape and orientation of spray jets to be controlled and adapted to the areas to be cleaned particularly easily.

According to a further preferred development, the webs may at the same time define an axial distance between the reflector and the surface, as a result of which no further elements are required for fastening the reflector and the overall construction can be made simple and robust.

According to an aspect of the invention, each spray jet (10, 10') can cover an area in the circumferential direction that resembles a sector of a circle with a defined center angle, wherein the cumulative sum of the center angles of all sectors of the circle that are simultaneously covered by the cleaning device is at least 180°, preferably at least 200°.

As a result, for example, relatively large areas to be cleaned that are required for a LiDAR can be effectively served by a single nozzle.

According to a preferred embodiment, the nozzle may be arranged essentially between the functional units within the housing, whereby the installation space can be effectively used and an optimum cleaning effect can be realized on the largest possible surface.

According to a further preferred embodiment, the cover may cover at least two functional units at the same time, as a result of which a particularly esthetic external appearance can be realized.

According to the particularly preferred embodiment of the invention, the device is provided as a LiDAR device with a transmitter unit for emitting a laser beam and a receiver unit for detecting a reflected laser beam, the internal structure of which and the comparatively large surface of the cover to be cleaned provide optimum conditions for the integration and use of the cleaning system constructed according to an aspect of the invention.

Another embodiment of the invention provides that the reflector is arranged such that it is coupled to a lifting device, which moves the reflector from a retracted state not ready for spraying into an extended state ready for spraying and wherein the reflector is positioned essentially flush with the surface of the cover in the retracted state. Here, the nozzle may be provided according to various developments both such that it is likewise coupled to the lifting device and such that it is fixed to the housing.

As a result, the cleaning device can be designed to be particularly inconspicuous, while retaining all of its functional properties and advantages. In addition, the nozzle is particularly effectively protected from environmental effects such as contamination or icing.

BRIEF DESCRIPTION OF THE DRAWINGS

An aspect of the present invention is explained in greater detail below by way of example and in a greatly simplified manner on the basis of several different exemplary embodiments. In the figures.

In all of the plan views, the reflector is shown as completely transparent and only represented by its outer contour for a better representation of the elements located under it.

DETAILED DESCRIPTION OF THE PREFERRED EMBODIMENTS

Figure 1:
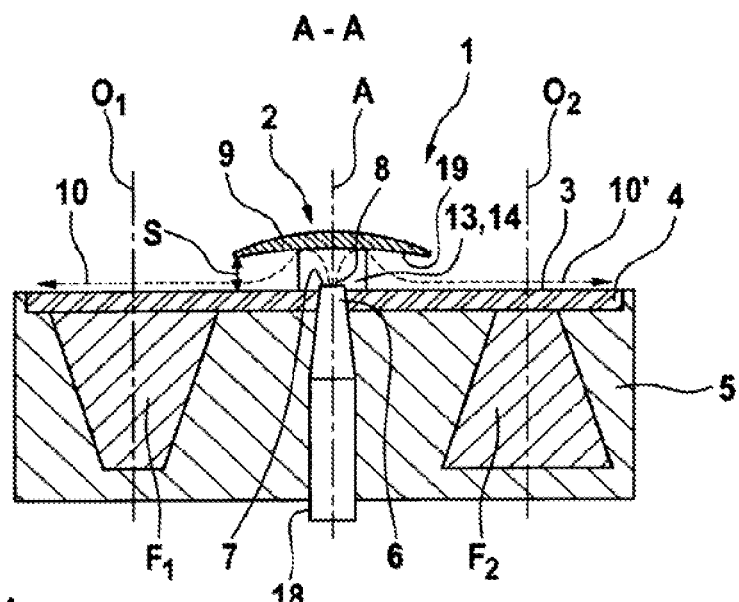
FIG. 1 shows a first embodiment according to the invention in cross section.
Figure 2:
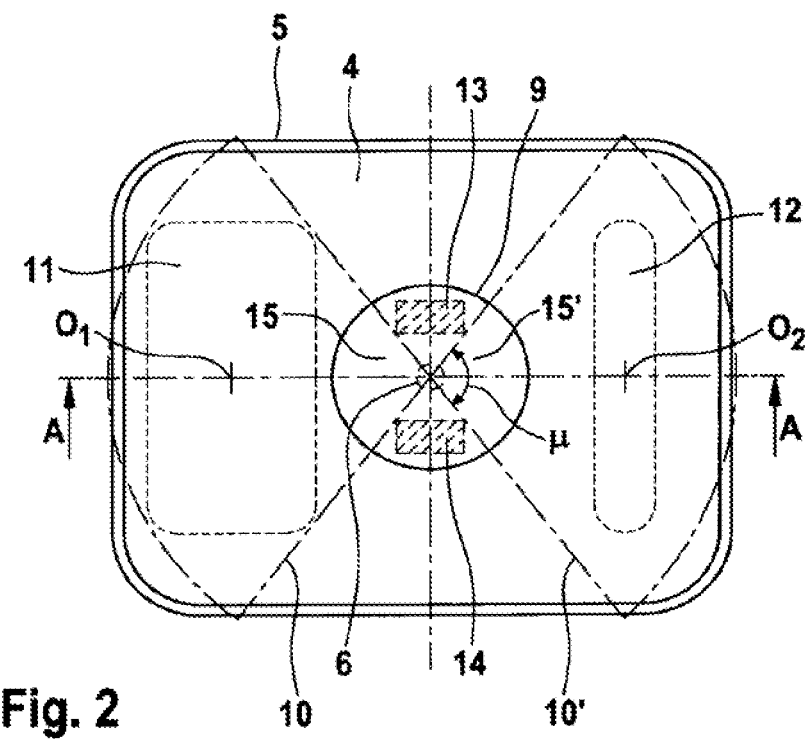
FIG. 2 shows the embodiment according to FIG. 1 in plan view.

FIGS. 1 and 2

As an example of a preferred embodiment, in FIGS. 1 and 2 a Light Detection And Ranging device 1 or LiDAR, designed according to the invention, is shown in a greatly simplified form.

Inside the LiDAR housing 5 there are two functional units spatially separated for functional reasons—a functional unit F2 formed as a transmitter unit for emitting a laser beam and a first functional unit F1 formed as a receiver unit for detecting a reflected laser beam. Each of the two functional units F1, F2 has its own optical axis O1 and O2, respectively, which penetrate a transparent cover 4. The cover 4 essentially serves for providing protection for the functional units F1 and F2 from the effects of the weather and also fulfills an esthetic function because it is arranged in the outside area of the vehicle. In the present embodiment, the two functional units are accommodated under a single, common cover 4, while it is permissible within an aspect of the invention also to use a number of separate covers.

On the surface 3 of the cover 4 there are two separate areas 11 and 12, under which at least the optically effective elements of the functional units F1 and F2 are arranged and which therefore have to be cleaned.

A cleaning device 2 according to an aspect of the invention, which can clean the areas 11, 12 simultaneously, is provided for cleaning the portions of the surface 3 comprising the areas 11, 12.

Arranged in the housing 5 between the functional units F1, F2 is a nozzle 6, which sprays a fluid cleaning agent as required. The cleaning agent is fed to the nozzle 6 for example by a pump, not shown here, via an inflow line 18 and is sprayed from an outlet opening 7 as a jet of cleaning agent 8 along a spray axis A, which is aligned essentially parallel to the two optical axes O1 and O2.

The jet of cleaning agent 8 impinges on a disk-shaped reflector 9 arranged at a distance from the outlet opening 7 and from the surface 3 and is reflected or deflected by this in the direction of the surface 3. The underside 19 of the reflector 9 facing the nozzle 6 is preferably designed as flat or moderately concave, so that the cleaning jet 8 is formed into a flat jet when it is deflected.

When viewed from the outside, the reflector 9 completely covers the nozzle 6 and can also be technically designed as desired, so that the cleaning device 2 is not recognized or perceived at all as such by an outside observer.

In the embodiment shown, two webs 13, 14 extending essentially in the direction of the surface 3 are arranged on the underside 19. These are at a distance radially from the spray axis A in such a way that between two adjacent webs 13, 14 in the circumferential direction there is in each case a breakthrough 15, 15'. The webs 13, 14 block the deflected jet of cleaning agent 8, whereby a fan-shaped flat spray jet 10, 10' in each case exits radially through each opening 15, 15' in the direction of the respective area 11, 12 to be cleaned, wets it and cleans it.

In the embodiment shown, the webs 13, 14 are of the same size and are arranged symmetrically and parallel with respect to the sectional plane A-A, so that breakthroughs 15, 15' of the same size are present in different radial directions. This results in two spray jets 10, 10' of equal size, which are uniformly separated from one another in the circumferential direction and which each cover an area similar to a sector of a circle with a center angle μ of approximately 100°.

Moreover, the webs 13, 14 define an axial distance s between the reflector 9 and the surface 3.

A defined combination and design of the underside 19 of the reflector 9 in conjunction with its distance s from the surface 3 and the distance from the nozzle 6, the shape and position of the webs 13, 14 and the pressure and cross section of the jet of cleaning agent 8 can achieve the effect that the spray jet or jets 10, 10' wet the areas 11, 12 as exactly and completely as possible. This means that the cleaning agent can be used particularly sparingly.

FIG. 3

Figure 3:
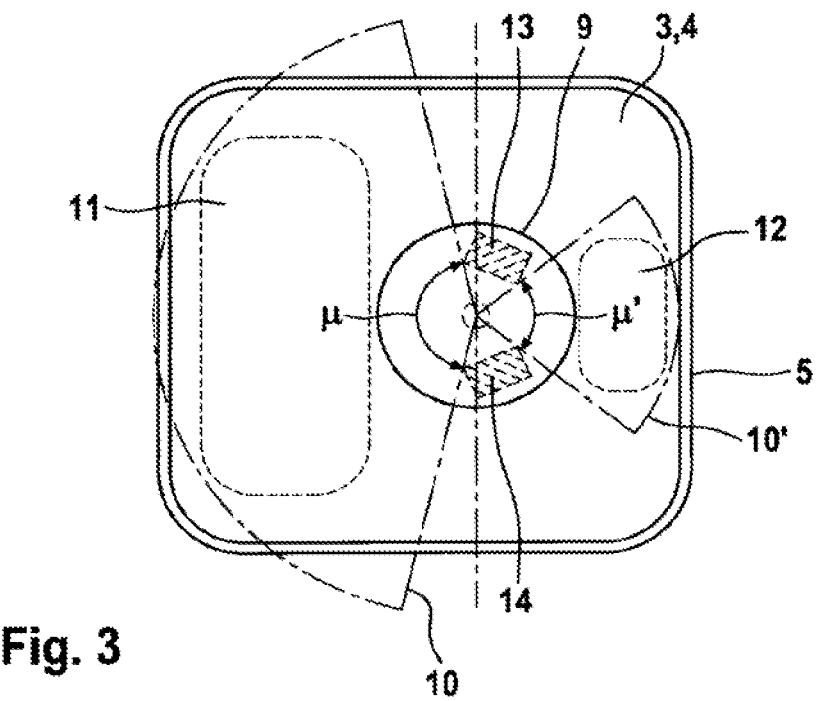
FIGS. 3 and 4 show further exemplary embodiments with differently formed spray jets in plan view.

FIG. 3 shows a further exemplary embodiment of the invention.

The areas 11 and 12 are in this case formed as significantly different in size. As a difference from the embodiment described above, the webs 13, 14 are arranged as non-parallel and eccentrically displaced and inclined in such a way as to create breakthroughs of different sizes, and thus spray jets 10, 10' of different sizes with in each case different center angles μ, μ', in different radial directions. A clever design and defined spatial arrangement of the webs 13, 14 allow the spray jets 10, 10' to be adapted exactly to the size of the respective area 11, 12 to be cleaned.

FIG. 4

Figure 4:
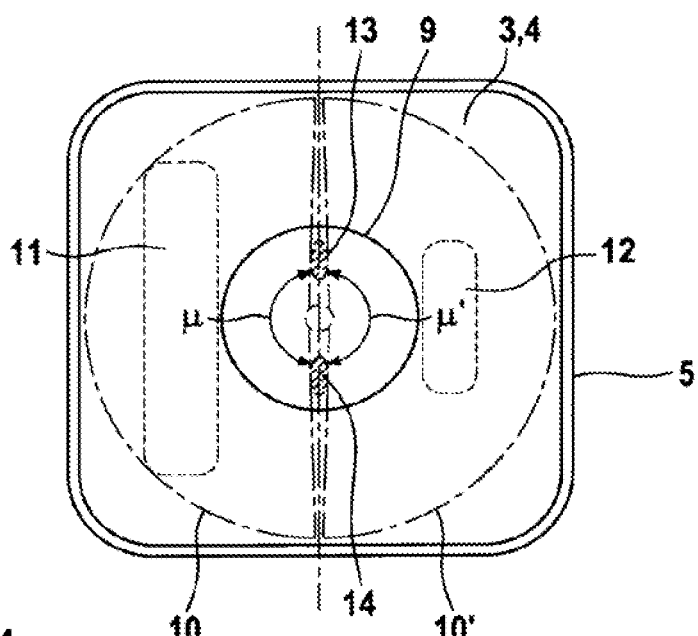

In the exemplary embodiment shown in FIG. 4, the webs 13, 14 are designed to be particularly narrow and streamlined in the radial direction. By utilizing the Coandă effect at the arched flanks of the webs 13, 14, a wetting of the surface 3 that is uninterrupted in the circumferential direction can also be realized if necessary. This may be for example in the case of particularly small housings 5.

Figure 5:
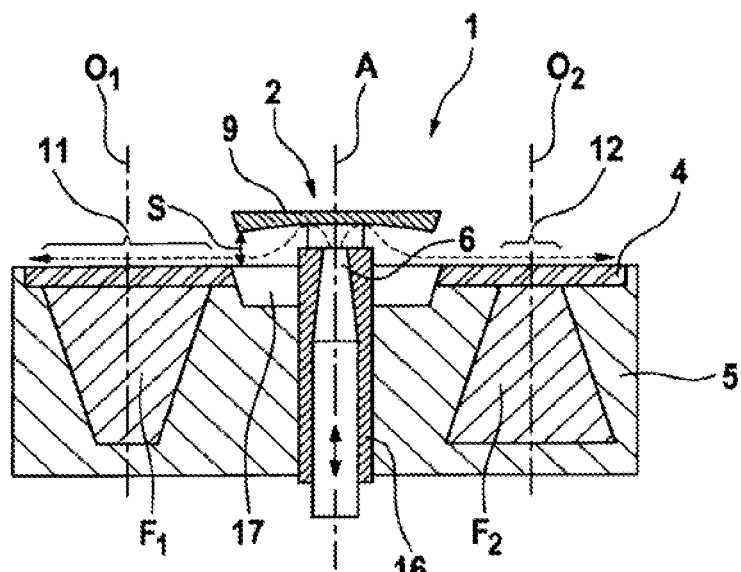
FIG. 5 shows another embodiment according to the invention with a lifting device in the extended state in cross section.
Figure 6:
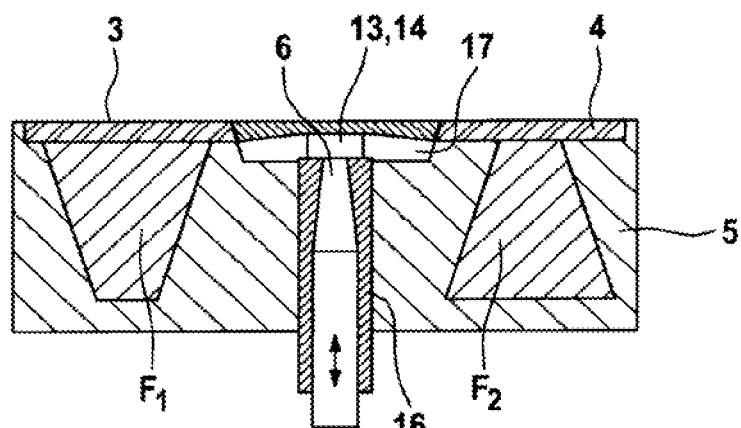
FIG. 6 shows the embodiment according to FIG. 5, in the retracted state.

FIGS. 5 and 6

In FIGS. 5 and 6, another embodiment according to the invention is shown. The reflector 9 is connected to a lifting device 16, which moves the reflector 9 from a retracted state not ready for spraying (FIG. 6) to an extended state ready for spraying (FIG. 5) at an intended axial distance s from the surface 3.

In the cover 4 and the housing 5, a trough 17 adapted to the reflector 9 is in this case provided, so that the reflector 9 is positioned essentially flush with the surface 3 of the cover 4 in the retracted state.

The nozzle 6 may be formed within an aspect of the invention both such that it is coupled to the lifting device 16 as shown, so that it is retracted and extended together with the lifting device, and such that it is fixed in place with respect to the housing 5, so that only the reflector 9 is moved by the lifting device 16.

LIST OF REFERENCE SIGNS

1 Optical or optoelectronic device
2 Cleaning device
3 Surface
4 Transparent cover
5 Housing
6 Nozzle
7 Outlet opening
8 Outlet opening
9 Reflector
10 Spray jet
11 Area to be cleaned
12 Area to be cleaned
13 Web
14 Web
15 Breakthrough
16 Lifting device
17 Trough
18 Inflow line
19 Underside
A Spray axis
F1 Functional unit
F2 Functional unit
O1 Optical axis
O2 Optical axis
S Distance
μ Center angle

The invention claimed is:

1. An optical or optoelectronic device, comprising:
a housing;
at least one transparent cover;
a cleaning device for cleaning a surface of the at least one transparent cover with a fluid cleaning agent, the cleaning device including at least one nozzle arranged in the housing, the at least one nozzle having an outlet opening, from which a jet of cleaning agent exits along a spray axis; and
a reflector, which is at least temporarily or permanently arranged at a first distance from the outlet opening and at a second distance from the surface of the at least one transparent cover, and facing the outlet opening, wherein the reflector and the at least one nozzle are separate components spaced apart from each other;
wherein the jet of cleaning agent is directed against the reflector, so that the jet of cleaning agent is reflected by the reflector and is deflected onto the surface of the at least one transparent cover as at least two essentially flat spray jets, which are separated from one another in a circumferential direction with respect to the spray axis and are oriented in different radial directions on the surface of the at least one transparent cover.

2. The optical or optoelectronic device as claimed in claim 1 wherein the optical or optoelectronic device has at least a first and a second area to be cleaned, which are spatially separated from one another, wherein each area is respectively assigned to a separate functional unit, each with at least one optical axis of its own.

3. The optical or optoelectronic device as claimed in claim 2, wherein the cleaning device is designed for the simultaneous cleaning of the areas and wherein each area is wetted by one of the at least two essentially flat spray jets.

4. The optical or optoelectronic device as claimed in claim 3, wherein the spray jets are separated and shaped by webs which extend from the reflector essentially in the direction of the surface of the at least one transparent cover and are at a radial distance from the spray axis, so that between two adjacent webs in the circumferential direction there is a breakthrough for the exiting of one spray jet in each case.

5. The optical or optoelectronic device as claimed in claim 4, wherein the webs define an axial distance between the reflector and the surface of the at least one transparent cover.

6. The optical or optoelectronic device as claimed in claim 3, wherein each spray jet covers in the circumferential direction essentially a sector of a circle with a defined center angle, wherein the cumulative sum of the defined center angles is at least 180°.

7. The optical or optoelectronic device as claimed in claim 6, wherein the cumulative sum of the defined center angles is at least 200°.

8. The optical or optoelectronic device as claimed in claim 3, wherein the at least one nozzle is arranged essentially between the functional units.

9. The optical or optoelectronic device as claimed in claim 3, wherein the at least one transparent cover covers at least two functional units.

10. The optical or optoelectronic device as claimed in claim 3, wherein the optical or optoelectronic device is a LiDAR (Light/Laser Detection And Ranging) device, wherein a first functional unit is a receiver unit for detecting a reflected laser beam and a second functional unit is a transmission unit for emitting a laser beam.

11. The optical or optoelectronic device as claimed in claim 1, wherein the reflector is essentially disk-shaped.

12. The optical or optoelectronic device as claimed in claim 1, wherein the reflector is arranged on a lifting device, which moves the reflector from a retracted state not ready for spraying into an extended state ready for spraying, wherein the reflector is positioned essentially flush with the surface of the at least one transparent cover in the retracted state and axially at a distance from the surface of the at least one transparent cover in the extended state.

13. The optical or optoelectronic device as claimed in claim 12, wherein the at least one nozzle is formed such that it is coupled to the lifting device, so that it is retracted and extended together with the lifting device.

14. The optical or optoelectronic device as claimed in claim 1, wherein the first distance and the second distance are the same.

\* \* \* \* \*